W. B. Wadsworth,
Windlass Water Elevator,

Nº 37,535. Patented Jan. 27, 1863.

Witnesses.

Inventor,
W. B. Wadsworth

UNITED STATES PATENT OFFICE.

WILLIAM B. WADSWORTH, OF CLEVELAND, OHIO.

IMPROVEMENT IN WATER-ELEVATORS.

Specification forming part of Letters Patent No. 37,535, dated January 27, 1863.

*To all whom it may concern:*

Be it known that I, WILLIAM B. WADSWORTH, of Cleveland, in the county of Cuyahoga and State of Ohio, have invented a new and useful Improvement in Water-Elevators for Raising Water from Wells, Cisterns, &c.; and I do hereby declare that the following is a full and exact description thereof, reference being had to the accompanying drawings and letters of reference marked thereon, in which—

Figure 3:
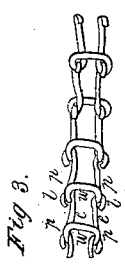
Figure 2:
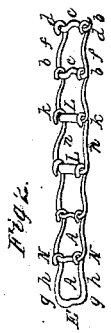
Figure 6:
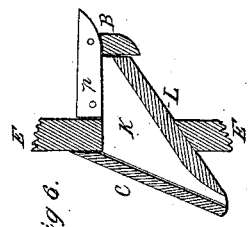
Figures 4, 5:
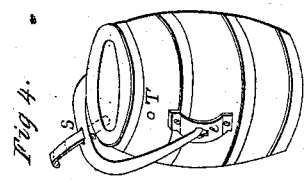
Figure 1:
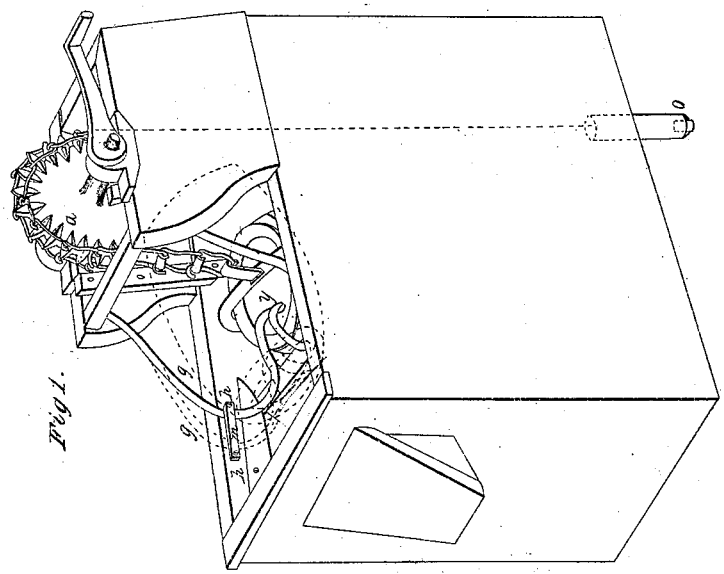

Figure 1 is a perspective view of the machine in operation. Fig. 2 shows the chain, and Fig. 3 shows other chains that are applicable. Fig. 4 shows a bucket having a stop in front of the bail. Fig. 5 shows a bucket having holes elongated under the pivots of the bail and hook under the center of bail. Fig. 6 is a side view of the delivery-spout.

In constructing, I make a curb and mount it with a wheel and shaft, substantially as shown at $a$, Fig. 1, the wheel having two small teeth, shaped nearly like blunted arrow-heads, with one side flattened, within each link of the chain, and small bearings on each or every other tooth for the wet chain to rest on, and thus prevent obstruction by ice. I show several forms of links in my chain. The chain may be made of wire links, as shown at $c\,b\,b\,f\,f\,d\,d$, Fig. 2. The chain is put over the wheel, and a bucket on one end and counterbalance on the other. The bucket may be made as usual, with or without a valve in the bottom—iron bottom preferred. The upper hoop may be made widest in front and bent outward, with the staves beveled off, forming a spout.

The bail is hinged near the center of the bucket, which is made heaviest in the back part by adding a weight thereto, and a stop, T, Fig. 4, is placed in front of the bail to keep it from canting back, and it will emerge from the water better without canting. When there is no valve in the bottom to make the bucket dip, the holes in the ears may be made oblong, as shown at O, Fig. 5, and when the bucket strikes the water and the chain slackens the bail drops down in the holes O, and the hook S catches on the edge of the bucket, as shown by dotted lines, and pulls it over to dip. A catch may be put on the edge of the bucket for the hook S to catch in, at pleasure. The bucket may be emptied by a tilter, formed and arranged substantially as shown at $g\,y$, Fig. 1, hung on pivots at the upper ends, and as the bucket comes up it is caught in the hook $y$ of the tilter and is pushed forward against the spout, and as the back part rises the front part of the bucket is prevented from rising by the upper curves of the hook $y$ until it is pinched between the point of said hook $y$ and the spout; then it turns as if hinged on the edge of the delivery-spout, as shown by the dotted lines, and is thus held there while emptying. The stops $h\,h$ keep the tilter from going too far either way. The cross-bars $m$ may be omitted at pleasure.

What I claim as my invention, and desire to secure by Letters Patent of the United States, is—

1. The toothed wheel, as shown and described.

2. The wheel, in combination with the chain $c\,b\,b\,f\,f\,d\,d$, substantially as shown and described.

3. The tilter $g\,y$, in combination with the flat chain $c\,b\,b\,f\,f\,d\,d$, substantially as shown and described.

4. The construction and arrangement of the curved tilter $g\,y$ and stops $h\,h$, substantially as shown and described.

WM. B. WADSWORTH.

Witnesses:
B. J. COBB,
C. C. COBB.